July 27, 1965 T. SPARKS ETAL 3,197,151

TAPE TRANSPORT

Filed March 6, 1963 4 Sheets-Sheet 1

INVENTORS
THOMAS SPARKS
MALCOLM F. THOMPSON
BY
A M Fernandez
ATTORNEY

INVENTORS
THOMAS SPARKS
MALCOLM F. THOMPSON

BY A M Fernandez

ATTORNEY

July 27, 1965 T. SPARKS ETAL 3,197,151

TAPE TRANSPORT

Filed March 6, 1963 4 Sheets-Sheet 3

INVENTORS
THOMAS SPARKS
MALCOLM F. THOMPSON

BY A. M. Fernandez

ATTORNEY

July 27, 1965 T. SPARKS ET AL 3,197,151

TAPE TRANSPORT

Filed March 6, 1963 4 Sheets-Sheet 4

INVENTORS
THOMAS SPARKS
MALCOLM F. THOMPSON

BY A M Fernandez

ATTORNEY 3,197,151
TAPE TRANSPORT
Thomas Sparks, Fullerton, and Malcolm F. Thompson, Santa Ana, Calif., assignors to North American Aviation, Inc.
Filed Mar. 6, 1963, Ser. No. 263,272
10 Claims. (Cl. 242—55.13)

This invention pertains to tape transports, and particularly to a tape transport of the magazine type.

A tape transport for a digital data processing system should be capable of maintaining uniform tension on the tape, even while starting and stopping. Methods employed in the past to maintain uniform tape tension have involved the use of expensive servo systems which require considerable space. In one method, tensioning arms provide slack between tape reels and drive capstans. When the tape transport starts, tape in the slack loop on the supply side is quickly accelerated. As the tensioning arm rapidly yields tape, it moves in one direction and energizes a motor. The tensioning arm continues to supply tape until the inertia of the supply reel is overcome. If the motor overdrives the supply reel, the tensioning arm takes up the slack in the tape to attempt to maintain uniform tension and deenergizes the drive motor or reduces its speed in response to movement in the oppoiste direction. A similar servo system is provided on the take-up side. The roles of the servo systems are quickly reversed by reversing the direction of the individual motors. In another but similar method, vacuum columns or chambers provide a slack or loop in the tape with nearly uniform tension.

Both methods are widely and satisfactorily used, but both are expensive and require considerable space for the individual reel motors and tape loops. For many applications, it is desirable to provide less expensive or more compact tape transports, such as for mobile data processing systems, and it is often desirable to provide a tape transport of the magazine type.

A difficulty encountered in the development of magazine-type tape transports is maintaining uniform tape tension without resorting to servo systems. In the past, a single motor has been provided for a single capstan mounted in a tape transporting structure into which a magazine supporting the two reels may be inserted. The capstan is adapted to engage the tape and drive it past magnetic transducers mounted on the tape transport structure, and further adapted to engage a belt or chain to drive the tape reels through an arrangement of mechanical drive elements so designed as to tend to cause the take-up reel rotation to be leading the tape and the supply reel rotation to be lagging the tape. Magnetic slip clutches coupling the reels to the mechanical drive elements prevent tension in excess of a predetermined amount from being developed on the tape and provide damping of the reels as an aid in preventing tape from spilling from the supply reel when the tape is decelerating. By utilizing magnetic slip clutches instead of mechanical slip clutches of the friction type, more nearly uniform tension is achieved.

The foregoing developments provide a readily interchangeable tape magazine and compact transport structure. A more complete description of an embodiment of those developments and their advantages is presented in a United States patent application Serial No. 305,878, filed August 20, 1963, a continuation of application Serial No. 24,274 filed April 25, 1960, now abandoned, and assigned to the assignee of the present application.

An object of the present invention is to provide an improved tape-tensioning system for a tape transport.

A further object is to provide an improved tape-tensioning system for a magazine-type tape transport.

Another object is to provide improved apparatus for controlling the rotation of tape reels during starting, stopping and reversing operations in such a manner as to maintain nearly uniform tension on the tape.

Another object is to provide apparatus for maintaining tension on the tape of a magazine after it is withdrawn from the transport supporting structure.

Still another object is to provide apparatus for locking the reels of a magazine against rotation until it is inserted into a transport supporting structure.

A further object is to provide apparatus for locking the reels of a magazine against rotation and to provide tension in the tape by taking up slack automatically as the magazine is withdrawn from the transport supporting structure.

These and other objects of the present invention are achieved in one illustrative embodiment of the invention by providing a magazine having a drive sprocket driven by a single motor on a transport supporting structure. Driven sprockets and a driving chain are arranged on the magazine in such a manner that, when the magazine is inserted into operating position in the transport supporting structure, the drive chain is engaged by the drive sprocket. The driven sprockets, which are also engaged by the chain, are each coupled to oppositely disposed, double-opposed overrunning clutches such that when the tape and chain are driven in one direction the supply reel is not being driven while the take up reel is rotably driven through a slip clutch in advance of the tape. Slip-clutches, preferably of the magnetic type, are employed to couple the reels to the double-opposed overrunning clutches so that the reels will slip relative to their associated driven sprockets and overrunning clutches. When the motor which drives the capstan is reversed, the roles of the reels are reversed since their double-opposed overrunning clutches are oppositely disposed in a manner described more fully hereinafter.

The magnetic clutches each comprise a permanent magnet rotor keyed to a sleeve rotatably mounted upon a supporting member and a rotor casing of soft steel to which a reel is detachably attached. The double-opposed overrunning clutches are so disposed that with the capstan rotating in one direction, the rotor of the take-up reel is positively driven while the rotor of the supply reel is locked against rotation. Since the amount of force exerted between the rotors and their casings varies as an almost linear function of the relative speeds between associated rotors and casings, a nearly uniform tension is maintained on the tape on both sides of the capstan as the tape is transferred from one reel to the other. By nearly uniform tension it is meant that tension is maintained sufficiently uniform for the tape transport to operate properly in such a manner that tape does not spill from the reels. The actual tension at any given moment during operation is a function of both the distribution of the tape between the two reels and the tape drive speed. However, for the amount of tape and the range of tape drive speeds used, the tape tension is sufficiently uniform so that under all operating conditions the tape reels are viscously damped by the magnetic rotors.

The reels are automatically restrained from rotating when the magazine is withdrawn from the transport supporting structure by spring biased levers, each having two arms one of which carries a rubber covered stud that is pressed against the rim of an assoicated one of the reels. The second arm of each lever is provided with a cam surface which is engaged by a post on the tape transport supporting structure as the magazine is inserted into operating position to pivot the levers away from their spring biased position. The posts also function as guides for the tape while it is being transported from one reel to another. The magnetic transducers are not in a line between the guide posts so that as the magazine is withdrawn from the transport supporting structure and the reels are automatically locked in position by the rubber covered studs, a slack in the tape is left between the reels. That slack is automatically taken up to keep some tension on the tape by pins on the levers so offset from the rubber covered studs that as the levers pivot the studs into position against the reel rims, the pins are swung into a position against the tape. The offsetting distance of the pins is selected to provide the desired tension in the tape.

The illustrative embodiment thus briefly described may be better understood from the following detailed description with refrence to the accompanying drawings in which.

Figure 1:
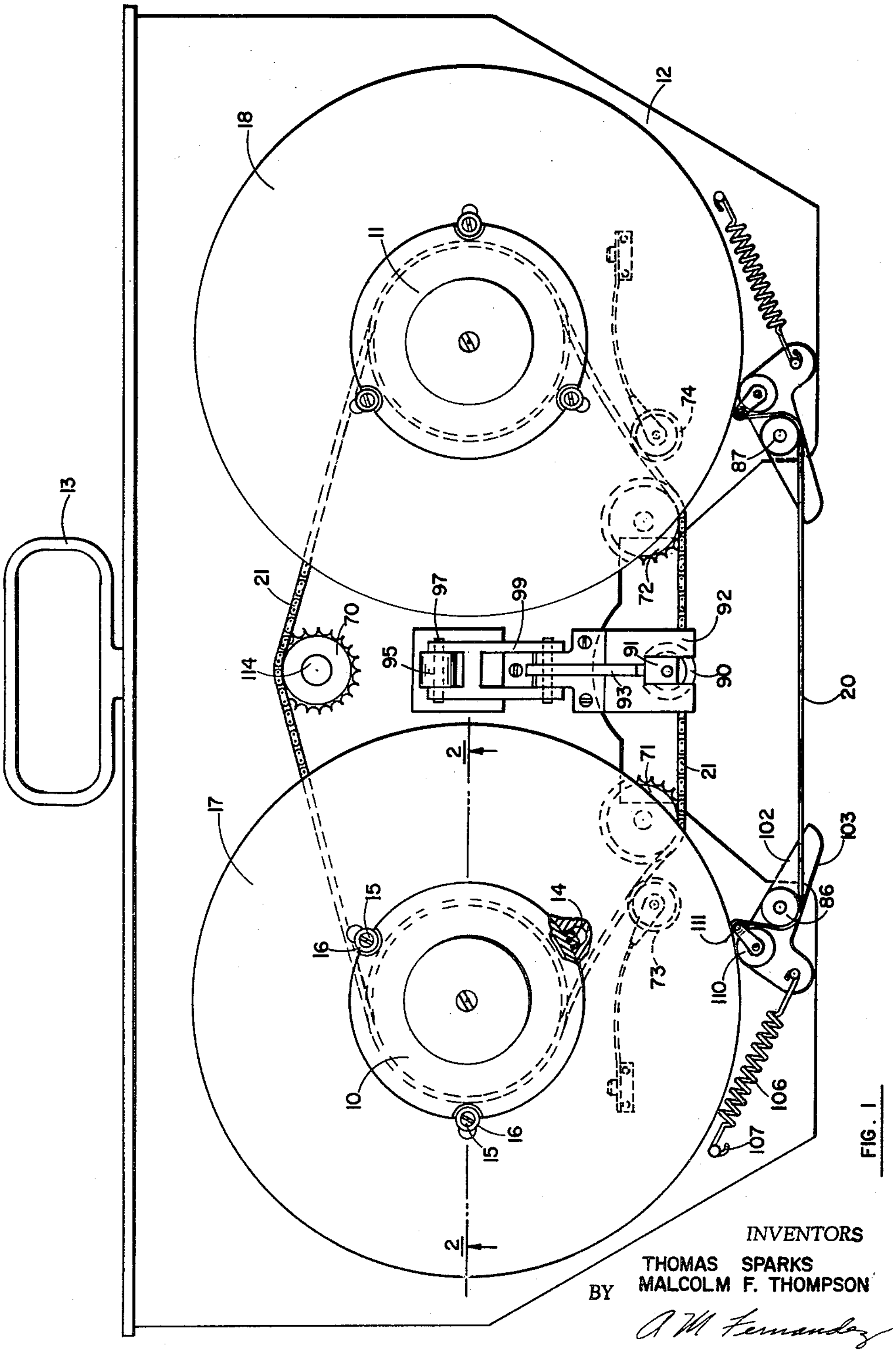
FIG. 1 is a plan view of a tape magazine.
Figure 5:
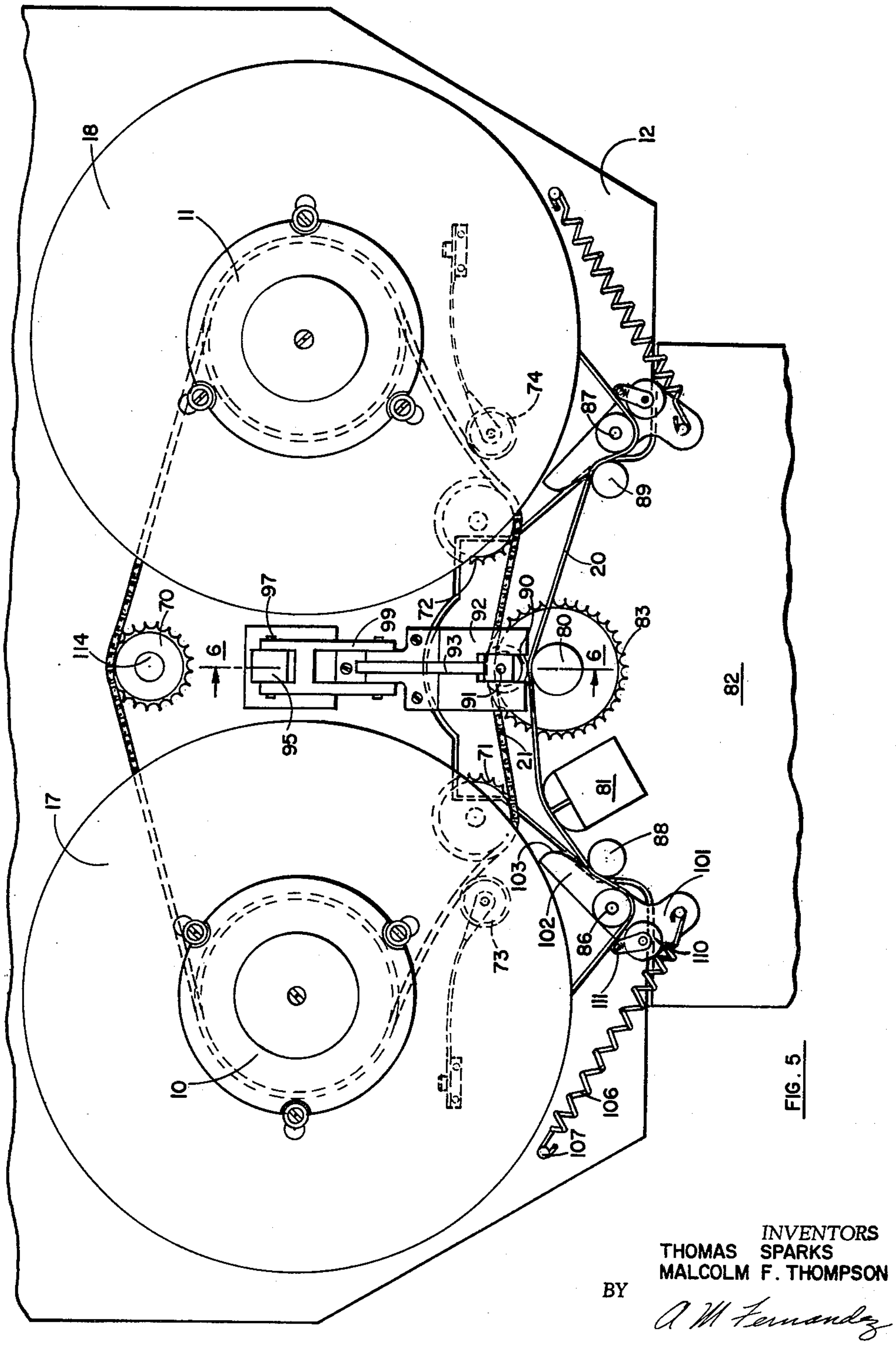
FIG. 5 is a plan view showing a portion of a tape magazine and a portion of a transport support structure with the tape magazine in operating position in the transport support structure.

Referring to FIG. 1, a pair of magnetic clutches 10 and 11 are mounted upon a tape magazine base plate 12 which is designed to be inserted into a transport supporting structure having a drive motor for read and write operations. A handle 13 is provided to facilitate inserting and withdrawing the magazine from the transport supporting structure 82 only a part of which is shown in FIG. 5. Each magnetic clutch casing is formed with tapped lugs 14 adapted to receive screws 15 which, together with associated washers 16, fasten reels 17 and 18 to the magnetic clutch casings.

Figure 2:
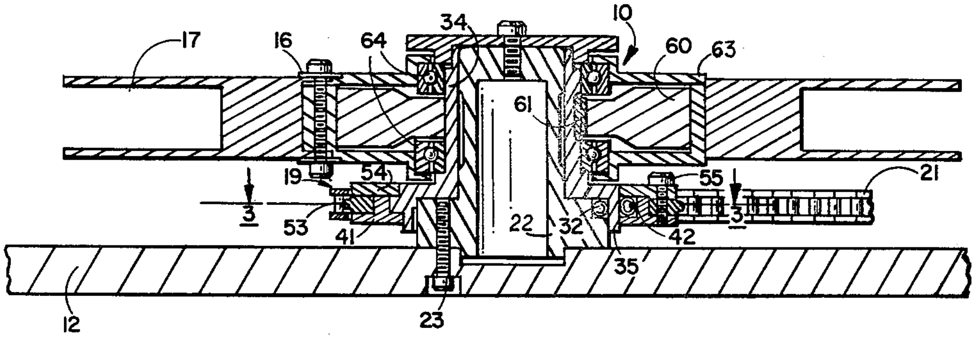
FIG. 2 is a cross section of a portion of the tape magazine on the line 2—2 of FIG. 1.
Figures 3, 4:
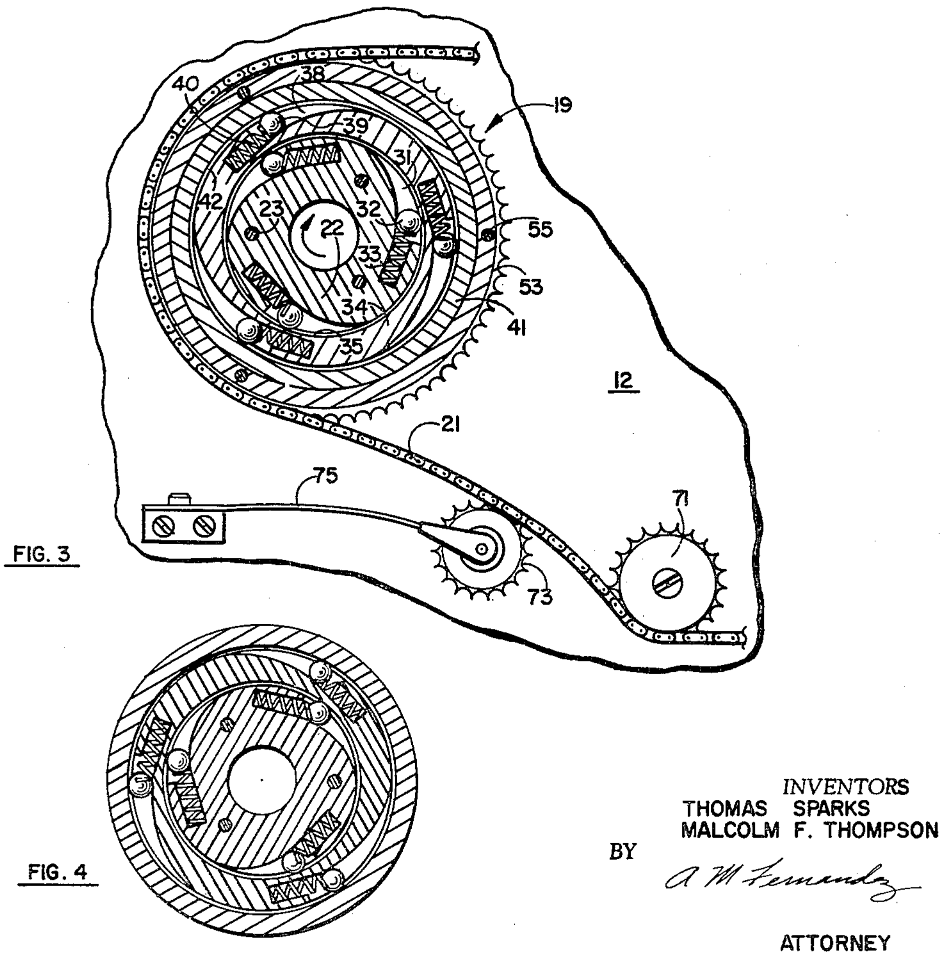
FIG. 3 is a cross section of a portion of the tape magazine on the line 3—3 of FIG. 2.
FIG. 4 is a schematic of a double-opposed overrunning clutch oppositely disposed to the overrunning clutch shown in cross section in FIG. 3.

In order to rotate the reels in either direction, each magnetic clutch is associated with a chain driven sprocket assembly 19, as shown in FIG. 2, a drive chain 21 and double-opposed overrunning clutch assemblies 31 to 35 and 38 to 42 as shown in FIG. 3. The overrunning clutches are so arranged as to cause the take-up reel to be rotated by its associated driven sprocket and to cause the supply reel to be effectively locked against rotation except for slippage allowed by its associated magnetic clutch. In that manner the take-up reel is rotated at a rate sufficient to maintain nearly uniform tension on the tape on the take-up side of a capstan 80 (FIG. 5) and the tape is pulled from the supply reel against a torque developed by its associated magnetic clutch to maintain a nearly uniform tension in the tape on the supply side of the capstan.

Referring to FIG. 2, there is shown secured to the base plate 12 a support member 22 for the magnetic clutch 10 associated with the reel 17. The support member 22 has a lower portion secured to the base plate 12 by screws 23. That lower portion has a plurality of notches 31 as shown in FIG. 3 into each of which is inserted a ball 32 and a spring 33 to form a first overrunning clutch, which permits relative motion in one direction between the support member 22 and a sleeve 34 by allowing the sleeve 34 to rotate clockwise. That first overrunning clutch employs the wedging action of the balls 32 to lock the sleeve 34 against rotation in the counterclockwise direction. Thus the first overrunning clutch automatically engages in the counterclockwise direction and freewheels in the clockwise direction. The sleeve 34 rotably mounted upon the supporting member 22 is formed with a turned diameter 35 more clearly seen in the cross-sectional view of FIG. 2 to provide a raceway against which the balls 32 are constantly pressed by the springs 33.

Referring again to FIG. 3, the lower portion of the sleeve 34 is formed at its outer periphery with a plurality of notches 38, each of which is loaded with a ball 39 and a spring 40 in the same way as were the notches 31 of the support member 22 to provide a second overrunning clutch which enables the reel 17 coupled to the sleeve 34 by its associated magnetic clutch 10 to be driven through its associated driven sprocket 19 for clockwise rotation while tape is being transferred from the reel 18 to the reel 17. While tape is being transferred in the opposite direction from the reel 17 to the reel 18, the second overrunning clutch assembly 38 to 42 disengages the driven sprocket 19 from the sleeve 34 so that the reel is not driven for counterclockwise rotation. At the same time, the first overrunning clutch assembly 31 to 35 between the support member 22 and the sleeve 34 engages to lock the sleeve against rotation. Under those circumstances, the reel 17 is pulled in a counterclockwise direction against the torque exerted by the magnetic clutch 10 as tape is taken up by the driven reel 18.

Considering one double-opposed overrunning clutch assembly, such as the clutch assembly for the reel 17 shown in FIGS. 2 and 3, when the chain driven sprocket assembly 19 is rotating clockwise, the outer or second overrunning clutch engages and the opposed inner or first overrunning clutch disengages to allow the driven sprocket assembly 19 to rotate the sleeve 34 clockwise so that tape being transferred to the reel 17 is taken up. It should be noted that the rotating sleeve 34 is what actually turns the reel through its associated magnetic clutch to take up tape. When the driven sprocket assembly 19 is turned counterclockwise, the outer or second overrunning clutch disengages and the inner or first overrunning clutch engages so that the sleeve 34 is locked against rotation through the balls 32 wedged against the support member 22.

When a given reel supplies tape, such as the reel 17, its associated sleeve 34 is automatically locked in position in the manner just noted. However, since the reel is coupled to the sleeve by a magnetic clutch, tape transported to the other reel by the capstan is pulled by the capstan 80 (FIG. 5) from the supply reel the magnetic clutch of which is designed to slip to produce the desired tension in the tape on the supply side of the capstan. On the take-up side of the capstan, tension is produced in the tape because when that reel is supposed to take up tape, its associated sleeve is free to rotate the take-up reel and thereby cause all slack in the tape to be taken up until a torque is developed which is sufficient to cause its associated magnetic clutch to slip.

In order that the take-up or supply role of one reel will always be opposite the role of the other reel, the double-opposed overrunning clutches associated with them are oppositely disposed. The disposition of the overrunning clutches for the second reel 18 of FIG. 1 is schematically illustrated in FIG. 4. The component parts and their operation are the same as for the double overrunning clutch for the first reel 17 illustrated in FIG. 3 except that the inner and outer overrunning clutches are reversed as may be more clearly understood by a comparison of FIGS. 3 and 4. In that manner, when one reel is locked but for the slippage of its associated magnetic clutch, the other reel is freewheeling but for the torque exerted by the tape which causes its associated magnetic clutch to slip. When the direction of rotation of the reels is reversed simultaneously by reversing the direction of the drive chain 21, the roles of the reels automatically reverse since a given overrunning clutch engages in one direction and freewheels in the other, and a given magnetic clutch engages in both directions.

Before describing the magnetic clutches, the assembly of the driven sprocket assembly 19 employed will be described with reference to FIGS. 2 and 3. It comprises separate parts but could just as well be made as an integral part. The lower portion of the sleeve 34 which carries the notches 38 of the outer overrunning clutch assembly has rotatably mounted upon it an annulus 41 which carries a sprocket wheel 53. A retaining ring 54 (FIG. 2) is secured to the annulus 41 by screws 55 so that the sprocket wheel 53 is clamped between the annulus 41 and the retaining ring 54.

The entire drive sprocket assembly of FIGS. 2 and 3 may be rotated relative to the sleeve 35 in a counterclockwise direction and relative to the spindle 22 in a clockwise direction. The directions of the relative rotations are reversed for the second reel 18 for the reason that the double overriding clutches are oppositely disposed as explained hereinbefore.

A cross section of the magnetic clutch assembly is shown in FIG. 2. It comprises a magnetic rotor 60 locked to the sleeve 34 by a key 61 and a two-piece casing 63 of soft iron or other material which will readily conduct magnetic flux. The magnetic rotor 60 has a number of poles around its periphery alternately magnetized north and south so that when the sleeve 34 is locked to the support member 22 by the inner or first overrunning clutch assembly 31 to 35, the magnetic rotor 60 is held in place, and when the sleeve 34 is rotated, the magnetic rotor 60 rotates as if it were an integral part of the sleeve 34.

The casing 63 acts as a return path between poles of the magnetic rotor 60 so that when it is rotated relative to the magnetic rotor 60, a torque is developed which is proportional to the difference in speed between the magnetic rotor 60 and the casing 63 to resist the relative motion therebetween. The casing 63 is mounted upon the sleeve 34 by means of bearings 64 so that it is free to rotate about the sleeve 34.

When the magnetic rotor is being driven, it develops a torque which acts upon the casing 63 to rotate the reel 17 in the same direction in which the magnetic rotor 60 is being driven. If, on the other hand, the reel 17 is being rotated as it supplies tape to the reel 18, a torque which resists its rotation is developed due to the stationary rotor 60 inducing an eddy current in the casing 63 to thereby resist rotation of the reel 17 sufficiently to produce the desired tension in the tape. Since the developed torques are proportional to the differences in speed between the magnetic rotors and their associated casings, the magnetic clutch assembly provides what may be referred to as viscous damping in the transportation of the tape, thereby producing a smooth operation and providing a force which stops a supply reel without spilling tape due to the inertia of the reel.

Figures 6, 7, 8:
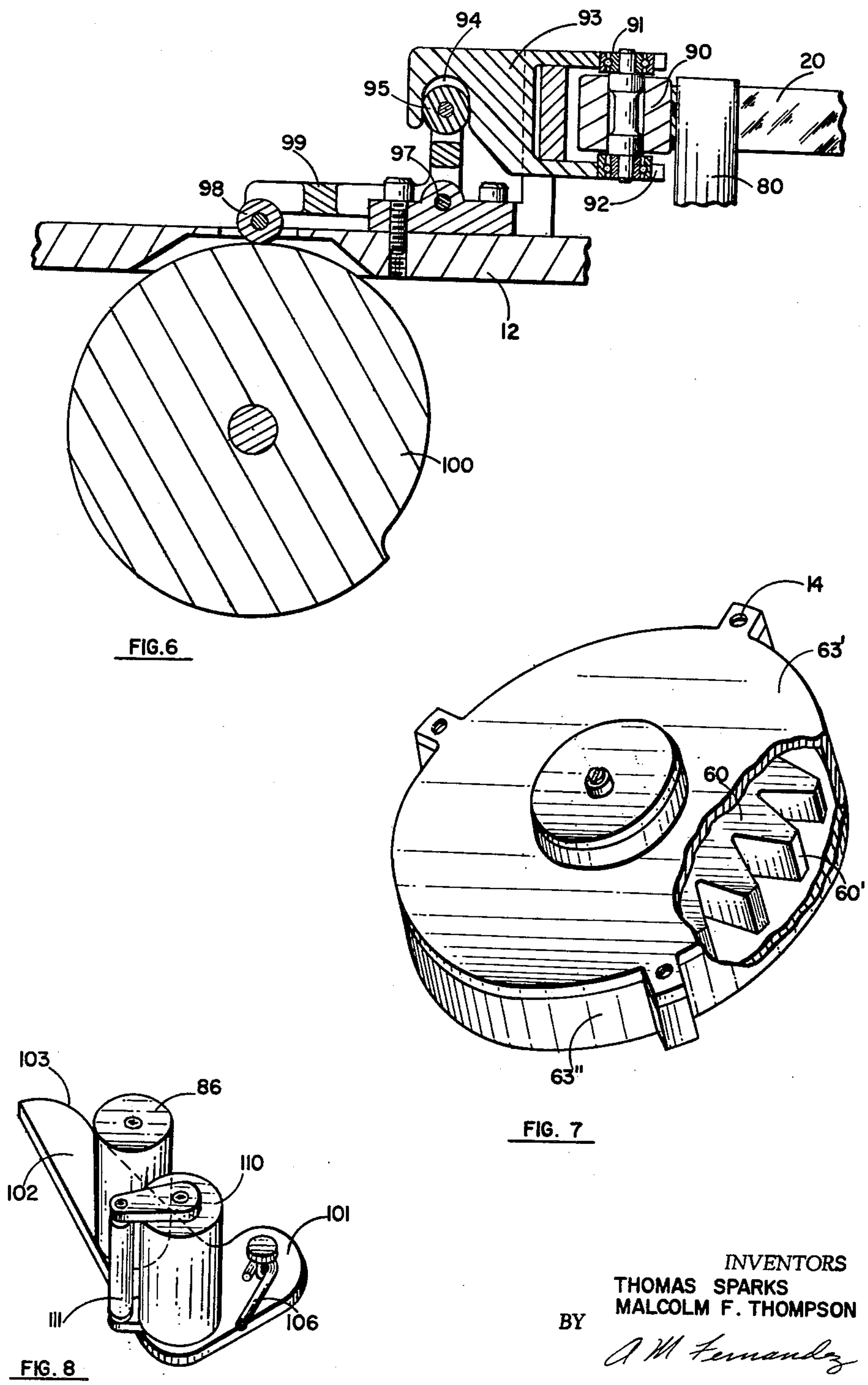
FIG. 6 is a cross section of a portion of a tape magazine taken on the line 6—6 of FIG. 5.
FIG. 7 is a perspective view of a magnetic clutch assembly with a portion of a two-piece casing broken away.
FIG. 8 is a perspective view of an assembly for automatically restraining the reels from rotating when the magazine is withdrawn from the supporting structure.

FIG. 7 illustrates a magnetic clutch assembly in perspective with a portion of its casing broken away. The shell is made of two pieces 63′ and 63″ in order to facilitate enclosing the rotor 60. In designing the rotor, as large a number of teeth 60′ as possible have been provided for a magnetic clutch diameter of three inches in order to provide a maximum magnetic force between the rotor and the shell.

From the foregoing, it is seen that the magnetic rotors 60 are driven by the driven sprocket assemblies 19 acting through associated overrunning clutches. The chain 21 for driving the sprocket assemblies 19, as illustrated in FIG. 4, passes over guiding idlers 70, 71 and 72 (FIGS. 1 and 5).

Tensioning sprockets 73 and 74 (FIGS. 1 and 5) are provided between the idler sprockets 71 and 72 and the reels 17 and 18. The sprocket 73, more clearly illustrated in FIG. 4, is secured to the base plate 12 by a leaf spring 75. The force exerted by the leaf spring 75 is sufficient to take up all slack in the drive chain 21 while the magazine is not in its operating position in the tape transport supporting structure as illustrated in FIG. 1.

The motor driven capstan 80 (FIG. 5) is mounted in the tape transport supporting structure 82 to meter or feed the tape past a magnetic transducer 81 also secured to the supporting structure 82. A drive sprocket 83 is coaxially connected to the capstan 80 at its base so that when the tape magazine of FIG. 1 is inserted into the tape transporting structure 82, only a part of which is shown in FIG. 5, the drive sprocket 83 engages the drive chain 21 and the capstan 80 engages the tape 20. The spring-mounted tensioning sprockets 73 and 74 yield sufficiently to allow the drive sprocket 83 to properly engage the chain 21 and maintain adequate tension and thereby keep the chain from fluttering as the motor (not shown) connected to the capstan 80 is caused to start, stop and reverse direction. Thus, the tape is transported from one reel to the other by the capstan 80 which drives the chain 21 via the drive sprocket 83 in the same direction.

The diameter of the drive sprocket 83 relative to the driven sprocket assemblies 19 of the reels 17 and 18 is selected to drive the take-up reel at such a rate that it tends to take up tape faster than it is being fed by the capstan 80, thereby causing its associated magnetic clutch to slip and produce a nearly uniform tension between the take-up reel and the capstan. The supply reel maintains adequate tension in the tape between it and the capstan due to the overrunning clutch assemblies which lock the magnetic rotor in the clutch of the supply reel, thereby developing a torque between the magnetic rotor and its associated casing, which tends to resist the rotation of the supply reel, as noted hereinbefore with reference to FIG. 2. In that manner the desired viscous damping of the supply reel is provided.

In summary, the arrangement of the overrunning clutch assemblies is such that if the lower portion of the chain 21 moves toward the right in FIG. 5, the magnetic rotor associated with the right-hand reel 18 will turn counterclockwise while the magnetic rotor associated with the left-hand reel 17 will be locked against counterclockwise rotation. The reel 17 is then functioning as a supply reel and is pulled against a resisting magnetic force by the tape 20 being fed to the take-up reel 18 by the capstan 80. The take-up reel 18 is rotatably driven due to the torque between its rotating magnetic rotor and its associated casing 63 with slippage therebetween, thereby establishing and maintaining a desired tension in the tape. Thus proper tape tension is maintained on both sides of the capstan 80, regardless of the direction of rotation of the capstan; a given reel rotating in one direction against a resisting torque is acting as a supply reel and rotating in another direction in response to a driving torque is acting as a take-up reel; and the torque in each instance exceeds that which is necessary to take up any slack in the tape and maintain nearly uniform tape tension. It should be noted that in each instance, excessive tension is not developed because of the yielding nature of the magnetic lines of force which allows the associated magnetic clutch to slip.

When the magazine is in operating position as shown in FIG. 5, the magnetic tape is guided across the read-write head 81 by means of two pairs of guide posts 86, 87 and 88, 89. Each post may be either fixed or rotatable. The guide post 87 can be made with insulated conducting portions (not shown) adapted to cooperate with special metallic markings applied to the ends of the magnetic tape in order to signal when the tape has reached an end running in either direction, in order that the tape transport control system may either stop the motor or reverse its direction.

To increase the tape friction on the capstan 80, a pressure roller 90 (FIG. 5) is provided mounted in small journals 91 which are retained for sliding in a block 92 fixedly connected to the base plate 12 of the magazine. A yoke 93 is slidably mounted in the block 92 and is formed at its left end as viewed in FIG. 6 with a slot 94 which constantly engages a roller 95 mounted upon the upwardly extending arm 96 of a bell crank pivoted at 97. A roller 98 is mounted upon the other arm 99 of the bell crank and may be operated to rotate the bell crank clockwise as viewed in FIG. 6 to move the pressure roller 90 against the tape 20 and the capstan 80 thereby establishing the friction between the capstan and tape necessary to pull the tape from the supply reel.

The means for rotating the bell crank arm 99 may take a variety of forms and while a cam 100 which may be actuated by a solenoid or motor (not shown) is illustrated, it is to be understood that any other suitable means may be employed. It should be further noted that the cam 100 is to be left in the actuated position to hold the pressure roller 90 against the capstan 80 only while the capstan drive motor (not shown) is on. A spring may be provided to return the capstan follower to a position away from the capstan when the cam is deactuated. To avoid consuming power during the time the pressure roller 90 is being pressed against the capstan 80, a suitable latching mechanism may be provided which will hold the pressure roller 90 against the capstan 80 until released by another solenoid or motor.

Since the tape reels 17 and 18 are mounted upon a magazine which is removable from the transport supporting structure, it is desirable that the reels be restrained when the magazine is removed to avoid spilling tape and that the tape be held in such a position as to properly engage the guide posts 88 and 89 fixed to the support plate 82 (FIG. 5), as well as the capstan 80 and the magnetic transducer 81 when the magazine is reinserted into the transport supporting structure. Referring to FIG. 5, it is seen that while the tape magazine is in an operating position, the magnetic tape 20 passes from the reel 17 to the guide post 86, thence to the fixed guide post 88, past the transducer 81 to the capstan 80 and from thence to the fixed guide post 89 and the guide post 87 to the reel 18. Pivotally mounted upon the guides 86 and 87 are levers having two arms 101 and 102. Arm 102 is formed with a cam surface 103 which may be more clearly seen in FIG. 1. That cam surface is provided for engagement with the associated fixed guide 88 (FIG. 5) when the magazine is inserted into the transport supporting structure. The arm 101 is fastened to one end of a spring 106, the opposite end of which is anchored to the magazine base plate 12 at 107 as shown.

As the tape magazine is withdrawn from the transport supporting structure, in an upwardly direction as viewed in FIG. 5, the cam surface 103 rides against and around the guide 88 in response to the force exerted by the spring 106 through the arm 101 until a rubber-covered stud 110 rigidly secured to the arm 101 comes to rest against its associated reel 17. As this occurs, the tape is engaged by an offset pin 111 which is attached parallel to the stud 110 in a manner more clearly shown in FIG. 8 so that as the magazine is withdrawn, the cam surface 103 acting on guide 88 allows the spring 106 to cause clockwise rotation of the lever 100 to the position shown in FIG. 1, which, in turn, causes the offset pin 111 to take up the slack in the tape and leave it taut between the two guides 86 and 87 of the magazine. In that manner, the tape is properly positioned for re-insertion of the magazine into the transport supporting structure and the reels are locked against rotation by the frictional engagement of the studs 110 while the magazine is removed from the transport supporting structure.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus for handling a record tape having tape drive means for reversibly transporting said tape from a first reel to a second reel by driving said tape at a given point between said first and second reels, comprising first and second support members fixedly connected to a base, first and second sleeves rotatably coupled to said first and second support members, respectively, first and second drive means associated with said tape drive means, first clutch means coupled to said first and second drive means for engaging said first sleeve for clockwise rotation of said first drive means and second clutch means for engaging said second sleeve for counterclockwise rotation of said second drive means, said first and second clutch means being adapted for automatically disengaging said first and second sleeves for counterclockwise and clockwise rotation of said first and second drive means, respectively, and first and second slip clutches coupling said first and second reels to said first and second sleeves, respectively, thereby allowing one sleeve to be locked in position while its associated reel rotates against the restraining force of the associated slip clutch to provide tension in the tape being supplied to the other reel and allowing the other reel to rotate to take up tape for a given tape transporting direction and maintain tension in the tape.

2. Apparatus for handling a record tape having tape drive means for reversibly transporting said tape from a first reel to a second reel by driving said tape at a given point between said first and second reels, comprising first and second support members fixedly connected to a base for supporting said first and second reels, respectively, first and second sleeves, first and second clutch means for rotatably coupling said first and second sleeves to said first and second support members, said first clutch means being adapted for disengaging said first sleeve from said first member for clockwise rotation and said second clutch means being adapted for disengaging said second sleeve from said second member for counterclockwise rotation, said first and second clutch means being further adapted for automatically engaging said first and second sleeves with said first and second members for counterclockwise and clockwise rotation, respectively, thereby locking said first and second sleeves against counterclockwise and clockwise rotation, respectively, first and second drive means associated with said tape drive means, third clutch means for engaging said first sleeve for clockwise rotation of said first drive means and fourth clutch means for engaging said second sleeve for counterclockwise rotation of said second drive means, said third and fourth clutch means automatically disengaging said first and second sleeves for counterclockwise and clockwise rotation of said first and second drive means, respectively, as said tape drive actuates said first and second drive means for rotation in the same direction at any given time, and first and second slip clutches coupling said first and second reels to said first and second sleeves, respectively.

3. Apparatus for handling a record tape having a reversibly driven capstan with a peripheral surface for frictional contact with said tape and a single pinch roller for pressing said tape into driving relation with said capstan, in combination with first and second support members for first and second reels, respectively, said members being fixedly connected to a base plate, first and second sleeves, first and second clutch means for rotatably coupling said first and second sleeves to said first and second support members, respectively, said first clutch means being adapted for disengaging said first sleeve from said first member for clockwise rotation and said second clutch means being adapted for disengaging said second sleeve from said second member for counterclockwise rotation, said first and second clutch means being further adapted for automatically engaging to lock said first and second sleeves against counterclockwise and clockwise rotation respectively, first and second reversible drive means, third and fourth clutch means for coupling said first and second reversible drive means to said first and second sleeves, respectively, said third clutch means being adapted to engage said first sleeve for clockwise rotation of said first drive means, and said fourth clutch means being adapted for engaging said second sleeve for counterclockwise rotation of said second drive means, said third and fourth sleeves being further adapted for automatically disengaging during counterclockwise and clockwise rotation of said first and second drive means, respectively, control means for selectively rotating said capstan in a clockwise and a counterclockwise direction, means responsive to said control means for driving said first and second reversible drive means in a clockwise direction for one direction of rotation of said capstan and in a counterclockwise direction for the other direction of rotation of said capstan, and first and second magnetic slip clutches axially coupling said first and second reels to said first and second sleeves, respectively.

4. An apparatus for handling a record tape having a reversibly driven means for transporting said tape between first and second reels comprising first and second supporting members for said first and second reels respectively, said members being fixably connected to a base plate, first and second sleeves, first and second overrunning clutches couplings said first and second sleeves to said first and second members, respectively, said first overrunning clutch being adapted to disengage said first member for clockwise rotation of said first sleeve and said second overrunning clutch being adapted to disengage said second member for counterclockwise rotation of said second sleeve, first and second driven sprocket wheels, third and fourth overrunning clutches coupling said first and second sleeves to said first and second driven sprocket wheels, respectively, said third overrunning clutch being adapted to engage said first sleeve for clockwise rotation of said first driven sprocket wheel and said fourth overrunning clutch being adapted to engage said second sleeve for counterclockwise rotation of said second driven sprocket wheel, a drive sprocket wheel coupled to said reversibly driven means for transporting tape, a chain coupling said drive sprocket wheel to said driven sprocket wheels, both said driven sprocket wheels being on the same side of the chain whereby both driven sprocket wheels are rotated in the same direction, and first and second slip clutches coupling said first and second reels to said first and second sleeves.

5. An apparatus for handling a record tape having a reversible tape drive means for transporting tape past a transducer comprising first and second tape reels, first and second support members for said first and second reels, respectively, first and second sleeves, first and second overrunning clutches coupling said first and second sleeves to said first and second support members, respectively, said first clutch being adapted for disengaging said first sleeve from said first member for clockwise rotation and said second clutch being adapted for disengaging said second sleeve from said second member for counterclockwise rotation, said first and second clutch means being further adapted for automatically engaging to lock said first and second sleeves against counterclockwise and clockwise rotation with respect to said first and second members, respectively, first and second reversible sleeve drive means, third and fourth overrunning clutches for coupling said first and second sleeves to said first and second reversible drive means, respectively, said third overrunning clutch being oppositely disposed to said first overrunning clutch to engage said first sleeve for clockwise rotation of said first drive means, and said fourth overrunning clutch being oppositely disposed to said second overrunning clutch to engage said second sleeve for counterclockwise rotation of said second drive means, means responsive to said reversible tape drive means for driving said first and second reversible sleeve drive means in a clockwise direction for one direction of transportation of said tape and in a counterclockwise direction of rotation for the other direction of transportation of said tape, and first and second magnetic slip clutches axially coupling said first and second reels to said first and second sleeves.

6. An apparatus for handling a record tape having a reversible tape drive means comprising first and second tape reels and a base plate, first and second support members for said first and second tape reels, respectively, said members being fixedly connected to said base plate, first and second sleeves, first and second overrunning clutches coupling said first and second sleeves to said first and second members, respectively, said first overrunning clutch being disposed to disengage for clockwise rotation of said first sleeve and said second overrunning clutch being oppositely disposed to said first overrunning clutch to disengage for counterclockwise rotation of said second sleeve, first and second driven sprocket wheels, third and fourth overrunning clutches coupling said first and second driven sprocket wheels to said first and second sleeves, respectively, said third overrunning clutch being oppositely disposed to said first overrunning clutch to disengage for clockwise rotation of said first driven sprocket wheel and said fourth overrunning clutch being oppositely disposed to said second overrunning clutch to disengage for counterclockwise rotation of said second driven sprocket wheel, a drive sprocket wheel coupled to said reversible tape drive means, a chain coupling said drive sprocket wheel to said driven sprocket wheels, both said driven sprocket wheels being on the same side of the chain whereby both driven sprocket wheels are rotated in the same direction, and first and second magnetic slip clutches axially coupling said first and second reels to said first and second sleeves.

7. Apparatus having a removable tape magazine containing two reels of tape, said reels of tape being arranged on a base plate for easy insertion into and withdrawal from a tape transport supporting structure having a recording transducer and tape drive means, and said tape magazine structure being adapted for operation at any speed selected for the rotation of said tape drive means, in combination with first and second supporting members for said first and second reels, respectively, said members being fixedly connected to said magazine base plate, first and second sleeves, first and second overrunning clutches for coupling said first and second sleeves to said first and second members, respectively, said first clutch being disposed for disengaging said first sleeve from said first member for clockwise rotation and said second clutch being oppositely disposed to said first clutch for disengaging said second sleeve from said second member for counterclockwise rotation, said first and second clutches automatically engaging to lock said first and second sleeve against counterclockwise and clockwise rotation, respectively, first and second reversible sleeve drive means, third and fourth overrunning clutches coupling said first and second reversible sleeve drive means to said first and second sleeves, respectively, said third clutch being disposed to engage said first sleeve for clockwise rotation of said first sleeve drive means and said fourth clutch being oppositely disposed to said third clutch means for engaging said second sleeve for counterclockwise rotation of said second sleeve drive means, means responsive to said tape drive means for driving said first and second reversible sleeve drive means in a clockwise direction for one direction of rotation of said tape drive means and in a counterclockwise direction of rotation for the other direction of rotation of said tape drive means, and first and second magnetic slip clutches axially coupling said first and second reels to said first and second sleeves, thereby allowing one sleeve to be locked in position while the associated reel rotates against the restraining force of the associated slip clutch to provide tension in the tape being supplied to the other reel and allowing the other reel to be rotated to take up tape for a given tape transporting direction, thereby maintaining tension in the tape.

8. Apparatus having a removable tape magazine containing two reels of tape, said reels of tape being arranged on a base plate for insertion into a tape transport supporting structure including a transducer and tape drive means for rotating a capstan having a peripheral surface for frictional contact with said tape, in combination with first and second support members fixedly connected to a base, first and second sleeves rotatably coupled to said first and second support members, respectively, first and second drive means associated with said tape drive means, first and second clutch means for coupling said first and second drive means to said first and second sleeves, said first sleeve for clockwise rotation of said first drive means and said second clutch means being adapted for engaging said second sleeve for counterclockwise rotation of said second drive means, said first and second clutch means being further adapted for automatically disengaging said first and second sleeves for counterclockwise and clockwise rotation of said first and second drive means, respectively, first and second slip clutches coupling said first and second reels to said first and second sleeves, respectively, thereby allowing one sleeve to be locked in position while its associated reel rotates against the restraining force of the associated slip clutch to provide tension in the tape being supplied to the other reel and allowing the other reel to rotate to take up tape for a given tape transporting direction and maintain tension in the tape, first and second pivotally mounted, spring-biased levers, first and second means connected to said first and second levers, respectively, for locking said first and second reels against rotation while said magazine is not in an inserted position in said tape transport supporting structure and said levers are in their spring biased position, said first and second means being adapted to release said first and second reels for rotation upon said first and second levers being pivoted away from their spring biased position and first and second posts fixedly mounted on the tape transport support structure, said posts being adapted to engage and pivot respective ones of said first and second spring-biased levers of said tape magazine away from their spring biased position upon said tape magazine being inserted into said transport supporting structure, thereby releasing said first and second reels for rotation.

9. Apparatus having a removable tape magazine containing two reels of tape, said reels of tape being arranged on a base plate for easy insertion into and withdrawal from a tape transport supporting structure having a recording transducer and drive means arranged to rotate a capstan having a peripheral surface for frictional contact with said tape in combination with first and second pivotally mounted, spring biased levers, first and second means connected to said first and second levers, respectively, for locking said first and second reels against rotation while said magazine is not in an inserted position in said tape transport supporting structure and said levers are in their spring biased position, said first and second means being adapted to release said first and second reels for rotation upon said first and second levers being pivoted away from their spring biased position, first and second support members for said first and second reels, respectively, said members being fixedly connected to said magazine base plate, first and second sleeves, first and second clutch means coupling said first and second sleeves to said first and second support members, respectively, said first clutch means being adapted for disengaging said sleeve from said member for clockwise rotation and said second clutch means being adapted for disengaging said second sleeve for counterclockwise rotation, said first and second clutch means being further adapted for automatically engaging to lock said first and second sleeves against counterclockwise and clockwise rotation, respectively, first and second reversible drive means, third and fourth clutch means for coupling said first and second sleeves to said first and second reversible drive means, respectively, said third clutch means being adapted to engage said first sleeve for clockwise rotation of said first drive means and said fourth clutch means being adapted to engage said second sleeve for counterclockwise rotation of said second drive means, means responsive to said tape drive means for driving said first and second reversible drive means in a clockwise direction for one direction of rotation of said capstan and in a counterclockwise direction of rotation for the other direction of rotation of said capstan, first and second slip clutches coupling said first and second reels to said first and second sleeves, and a pair of posts, each of said posts being fixedly mounted on the tape transport support structure and being adapted to engage and pivot a different one of said pivotally mounted spring biased levers of said tape magazine upon said tape magazine being inserted into said tape transport supporting structure, thereby releasing said first and second reels for rotation.

10. Apparatus having a removable magazine containing two reels of tape, said reels of tape being arranged on a base plate for insertion into a tape transport supporting structure including two guide posts, a transducer and a tape drive means for rotating a capstan having a peripheral surface for functional contact with said tape, said transducer and said capstan being disposed between said guide posts and offset from a straight line between said guide posts, in combination with first and second pivotally mounted, spring biased levers, first and second means connected to said first and second levers, respectively, for locking said first and second reels against rotation when said magazine is not in an inserted position in said tape transport supporting structure and said levers are in their spring biased position, said first and second means being fixedly connected to and offset from the pivot points of respective levers for releasing said first and second reels for rotation upon said first and second levers being pivoted away from their spring biased position, said levers having a cam surface adapted to pivotally engage said guide posts when said magazine is inserted into said tape transport supporting structure thereby releasing said first and second reels for rotation, and first and second pins fixedly connected to and offset from the pivot points of respective ones of said first and second levers, said pins being so disposed that, as said magazine is withdrawn from said transport supporting structure and said levers are returned to their spring biased, reel locking position, said pins are moved into the tape between the reels, thereby taking up any slack in the tape created when said tape between the reels is moved away from said transducer and capstan.

References Cited by the Examiner

UNITED STATES PATENTS

| | | | |
|---|---|---|---|
| 732,765 | 7/03 | Marvin et al. | 226—100 |
| 2,308,348 | 1/43 | Ballash | 226—100 |
| 2,484,552 | 10/49 | Camras. | |
| 2,499,895 | 3/50 | Walker. | |
| 3,027,110 | 3/62 | Andrews | 242—55.13 |
| 3,075,717 | 1/63 | Kingston | 242—55.13 |

MERVIN STEIN, *Primary Examiner.*